Sept. 29, 1959     O. D. DU BOIS     2,906,541
TOOL ADAPTER
Filed July 23, 1956
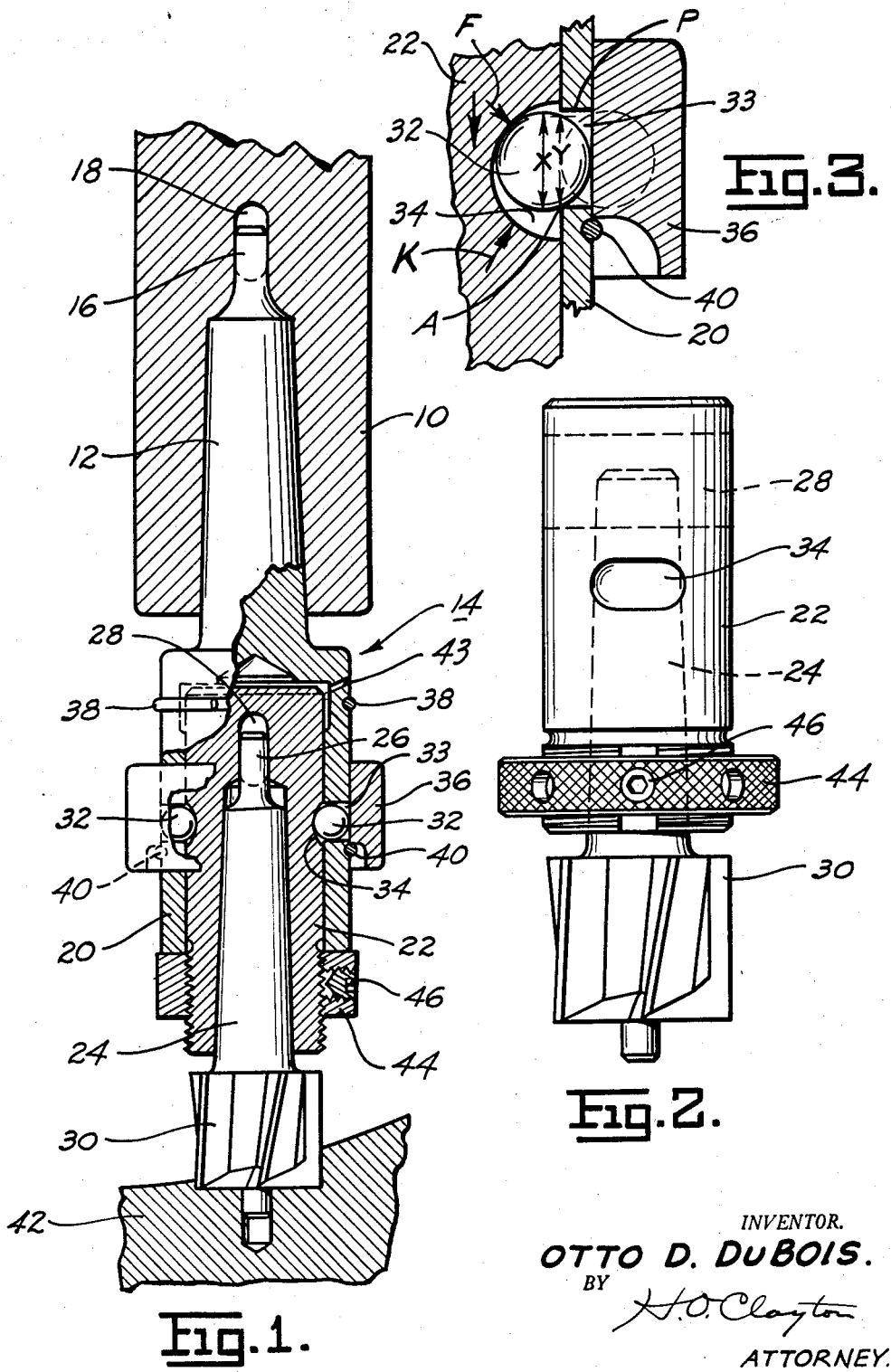
INVENTOR.
OTTO D. DuBOIS.
BY
*H. O. Clayton*
ATTORNEY.

United States Patent Office 2,906,541
Patented Sept. 29, 1959

2,906,541

TOOL ADAPTER

Otto D. Du Bois, South Bend, Ind., assignor to Bendix Aviation Corporation, South Bend, Ind., a corporation of Delaware Application July 23, 1956, Serial No. 599,455

5 Claims. (Cl. 279—82)

This invention relates in general to tool holders and in particular to a slack take-up mechanism constituting a part of a tool holder unit adapted to be secured to a drill press spindle.

In tool holders of the day including a collet secured to a chuck member there is usually an undesirable play in the connecting means holding the collet to the chuck; and until this play or lash is taken up there is an improper operation of the cutting tool mounted in the collet.

It is accordingly an object of my invention to provide, in the connecting means interconnecting the collet and clutch, means for taking up the aforementioned play when effecting the assembly operation of the mechanism.

A further object of my invention is to provide, in a mechanism for mounting a cutting tool in place, a simple, compact and easily serviced mechanism for eliminating all relative movement of the major parts of the mounting mechanism.

A further object of my invention is to provide a tool holder unit, including a chuck and a tool holding collet fitted within the chuck, means, secured to the collet and cooperating with the chuck, for securing the two parts together and preventing any subsequent relative movement between said parts.

Other objects of the invention and desirable details of construction of parts will become apparent from the following detailed description of an illustrative embodiment of the invention, taken in conjunction with the accompanying drawing illustrating said embodiment, in which:

Figure 1 is a sectional view disclosing the details of the tool holder unit constituting my invention;

Figure 2 is a side view disclosing the collet member of my tool holder unit together with a stop nut constituting an important feature of the invention; and Figure 3 is a sectional view disclosing details of the ball and socket connecting means of the mechanism of Figure 1, the parts being in their locked position.

There is disclosed in Figure 1 a preferred embodiment of my invention. In this figure, a cylindrically shaped power driven drill press spindle 10 is bored to receive the tapered shank 12 of a chuck 14, said chuck constituting a part of a tool holder unit. The upper reduced portion 16 of the shank extends within a laterally extending slot 18 in the spindle 10; and this construction facilitates the removal of the chuck from the spindle; for the attendant, to effect this operation, drives a wedge shaped tool into the slot 18 thereby forcing the chuck downwardly. A cylindrically shaped body portion 20 of the chuck is bored to receive a collet 22 which is bored to receive a tapered tool holder member 24; and, as with the shank of the chuck, this tool holder member has a reduced end portion 26 which fits into a laterally extending slot 28 in the collet. To remove the tool holder member 24 and a cutting tool 30 detachably mounted on its end, the attendant drives a wedge, not shown, into the slot 28 said wedge contacting the top of the reduced end portion 26 thereby forcing the tool holder member downwardly to facilitate its removal from the collet.

The collet 22 is secured to the body portion 20 of the chuck 14 by means of a ball and socket type of connection. This connecting means includes two annularly spaced balls 32, each adapted to snugly fit within a cylindrically shaped opening 33 in the chuck and nest within a recess 34 in the collet elliptical in outline. A locking band 36 sleeved over the chuck is adapted to encompass the balls 32 to hold the same in their locked position when the band is moved to the position disclosed in Figures 1 and 3. To connect the collet with the chuck, the attendant, after moving the band 36 upwardly against a stop ring 38 and out of the way of the balls, lines up the recesses 34 with the balls, the collet at the time being in its downward position with respect to the chuck, that is, extended downwardly from the position of these parts disclosed in Figure 1. He then pushes the collet upwardly, Figure 1, until the two recesses are opposite the balls whereupon he slides the band 36 downwardly thereby moving said balls into the recesses 34 to the locked position of the parts disclosed in Figures 1 and 3. The downward movement of the band is stopped by a stop ring 40. By this operation the collet, together with the tool holder member 24 and cutter tool 30, are locked in place and the attendant is now ready to perform the cutting operation upon a workpiece 42.

Coming now to the essence of my invention the balls 32, when moved to their locked position disclosed in Figures 1 and 3, do not snugly fit within the openings 33; for as will be noted from an inspection of Figure 3 of the drawings, the distance Y is less than the distance X, the latter being the diameter of the ball. Now the ball 32 is at this time seated at A as is disclosed in Figure 3; and this seating operation is effected by the operation of a nut 44, Figures 1 and 2, which is threadedly mounted on the end of the collet 22. An Allen set screw 46, threaded within an opening 46 in the nut, serves to hold said nut in place.

Explaining this operation when the nut 44 is screwed clockwise upon the collet, it eventually comes into contact with the immovable base of the body portion 20 of the chuck. Continued clockwise rotation of the nut 44 then serves to bodily move the collet downwardly in the direction of the arrow in Figure 3 thereby moving the balls 32 into contact with, that is seating the balls upon the chuck at point A referred to above. In this operation, the collet exerts a force upon the balls at a point indicated by the letter F, Figure 3.

It is apparent now that all lash between the collet and chuck is taken up by the above described operation, the degree of said lash being indicated by the letter P, Figure 3. Should this lash or play between the collet and chuck be allowed to remain, then the cutting operation is not as desired. With my invention, however, the simple expedient of the tightening up of the nut 44 results in the undesired play between the collet and chuck being taken out.

To remove the collet from the chuck, to make possible the insertion of say another tool holder member, the attendant will, after removing the completed workpiece 42, bodily slide the locking band 36 upwardly, then rotate the nut 44 counterclockwise, so that it will clear the end of the chuck, and lastly, bodily move the collet upwardly with respect to the chuck thereby moving the two balls 32 upwardly and outwardly to the dotted line position disclosed in Figure 3. In this operation, which is facilitated by an escape of air via an opening 43 in the chuck, the collet contacts the balls, that is exerts a force, at a point indicated by the letter K in Figure 3. The balls being clear of the collet, the latter is then bodily moved downwardly to remove it from the chuck, the tool holder member 24 is removed by driving the wedge, not shown, into the slot 28, another tool holder member is mounted in the collet, and lastly, the collet with its new tool holder member is then again locked into position within the clutch as described above.

There is thus provided, by the mounting of the nut 44 upon the end of the collet of my tool holder unit, means for improving the operation of the cutter tool 30; for all that is necessary is but to rotate said nut in contact with the end of the chuck until the undesired play between the collet and chuck is removed.

Although only one embodiment of the invention has been illustrated and described, various changes in the form and relative arrangements of the parts may be made to suit requirements.

I claim:

1. A tool holder unit including a chuck member having a shank adapted to fit within a driven drill press spindle, a collet detachably mounted within the chuck, a tool holder member detachably mounted within the collet, and means, including means threadedly mounted on the collet and contactable with the chuck, for taking up the play between the chuck and collet, said play being present in the connection between the two when they are first assembled.

2. A tool holder unit including a chuck member having a shank adapted to fit within a driven drill press spindle, a collet detachably mounted within the chuck by means of a ball and socket type connection, a tool holder member detachably mounted within the collet, and means threadedly mounted on the lower end of the collet and contactable with the end face of the chuck, for taking up the play between the chuck and collet, said play being present in the connection between the two when they are first assembled.

3. A tool holder unit including a chuck member bored to receive a collet and having a shank extending from its upper end adapted to fit within a driven drill press spindle, a collet detachably mounted within the chuck by means of a ball and socket connection, a tool holder member detachably mounted within the collet, and means for taking up play in the ball and socket connection when the collet is first mounted within the chuck, said means comprising a lock nut threadedly mounted on the lower end of the collet and contactable with the lower end face of the chuck.

4. A tool holder unit including a chuck member bored to receive a collet and having a shank extending from its upper end adapted to fit within a drill press spindle, a collet detachably mounted within the chuck by means of a ball and socket connection, said connection including a plurality of recesses in the outer surface of the collet and a plurality of balls mounted in openings in the chuck and adapted to be moved into and out of said recesses, a tool holder member detachably mounted within the collet, and means for taking up play in the ball and socket connection when the collet is first mounted within the chuck, said means comprising a lock nut threadedly mounted on the lower end of the collet and contactable with the lower end face of the chuck.

5. A tool holder unit including a chuck member bored to receive a collet and having a shank extending from its upper end adapted to fit within a driven drill press spindle, a collet detachably mounted within the chuck by means of a ball and socket connection comprising a plurality of recesses in the collet, elliptical in outline, a plurality of cylindrically shaped openings in the chuck and a plurality of balls adapted, when the collet and chuck are locked together, to lie in part within the recesses and in part within the openings, a tool holder member detachably mounted within the collet, and means for taking up play in the ball and socket connection when the collet is mounted within the chuck, said means comprising a lock nut threadedly mounted on the lower end of the collet and contactable with the lower end face of the chuck.

References Cited in the file of this patent

UNITED STATES PATENTS

| 2,491,605 | Chittenden | Dec. 20, 1949 |

FOREIGN PATENTS

| 813,789 | Germany | Sept. 17, 1951 |
| 874,855 | Germany | Apr. 27, 1953 |